US006552672B1

(12) United States Patent
Ghildiyal et al.

(10) Patent No.: US 6,552,672 B1
(45) Date of Patent: Apr. 22, 2003

(54) METHOD, SYSTEM AND PROGRAM STORAGE DEVICE FOR PROVIDING A BACKUP OF DATA OF A MEMORY TO AT LEAST ONE STORAGE MEDIUM

(75) Inventors: Ramkrishna Ghildiyal, Haryana (IN); Manabendra Mazumdar, Assam (IN); Shakul Gupta, Uttar Pradesh (IN); Basker Ponnuswamy, Tamil Nadu (IN); Gopal Bhaskaran, Karnataka (IN)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 10/100,897

(22) Filed: Mar. 18, 2002

(51) Int. Cl.[7] .............................................. H03M 7/00
(52) U.S. Cl. ....................................... 341/50; 341/106
(58) Field of Search ............................ 341/50, 51, 106, 341/65, 67, 87

(56) References Cited

U.S. PATENT DOCUMENTS 5,604,495 A * 2/1997 Watanabe ................... 341/106
5,734,892 A    3/1998 Chu

* cited by examiner

Primary Examiner—Brian Young

(57) ABSTRACT

A method of providing a backup of data of a memory portion, by at least one compressor and writer pair, to at least one storage medium having a plurality of segments is disclosed. The method includes partitioning the memory portion into a number of memory blocks. The compressor compresses data, block by block, to produce compressed data for each block. The writer writes the compressed data for each block to an associated segment of the storage medium. Compressing and writing are synchronized to occur in a pipelined manner so that the compressor is able to compress data of a next block without having to wait for the completion of writing of compressed data of an earlier block to the storage medium. A program storage device and a system for providing the above method are also disclosed.

18 Claims, 5 Drawing Sheets

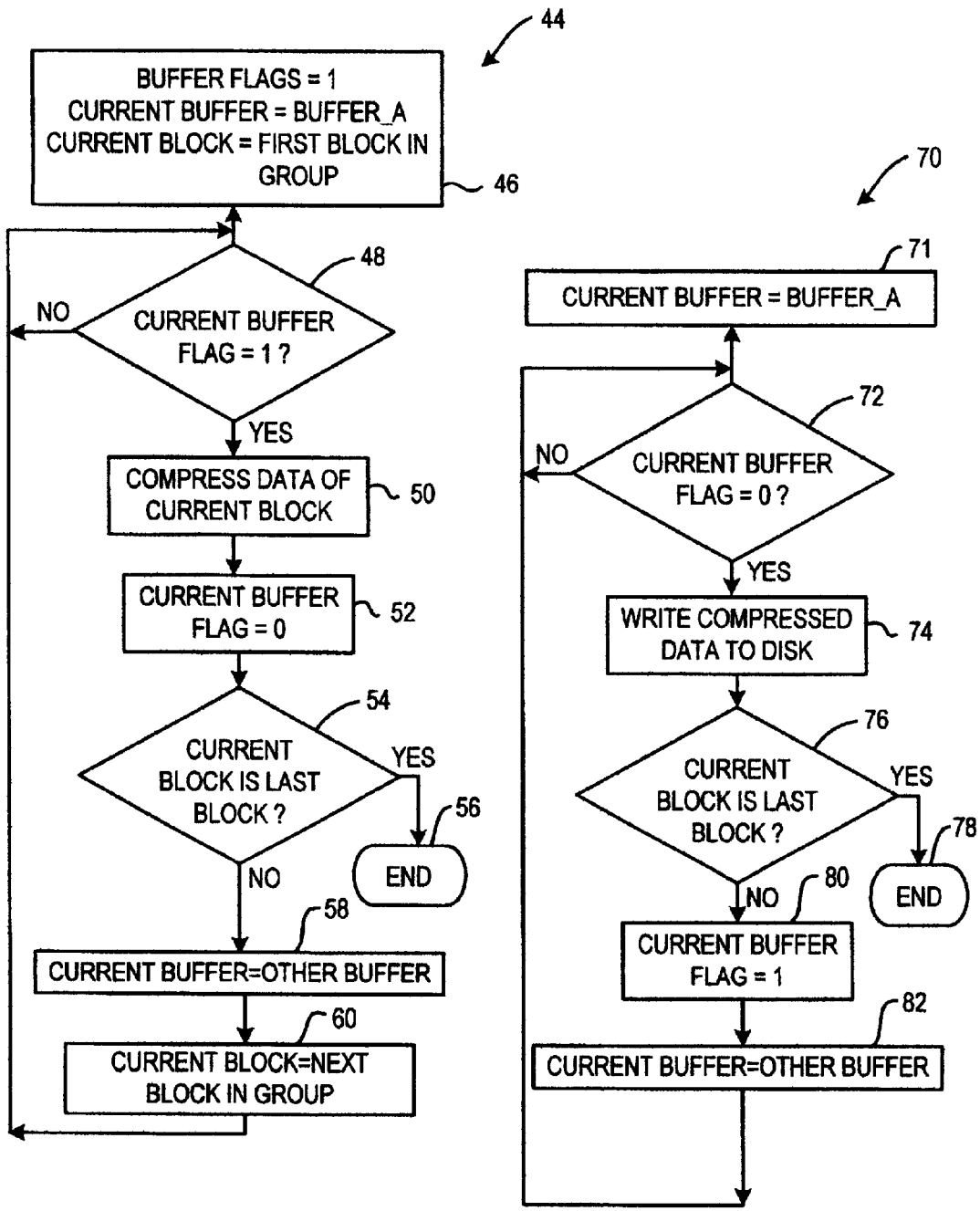

WITHOUT PIPELINING

| COMPRESS BLOCK 1 | WRITE BLOCK 1 | COMPRESS BLOCK 2 | WRITE BLOCK 2 | COMPRESS BLOCK 3 | WRITE BLOCK 3 | COMPRESS BLOCK 4 | WRITE BLOCK 4 |

PIPELINING USING ONE COMPRESSOR & WRITER PAIR

| COMPRESS BLOCK 1 | COMPRESS BLOCK 2 | COMPRESS BLOCK 3 | COMPRESS BLOCK 4 |
| | WRITE BLOCK 1 | WRITE BLOCK 2 | WRITE BLOCK 3 | WRITE BLOCK 4 |

$\Delta T2$

PIPELINING USING TWO COMPRESSOR & WRITER PAIRS

| COMPRESS BLOCK 1 | COMPRESS BLOCK 2 |
| | WRITE BLOCK 1 | WRITE BLOCK 2 |

| COMPRESS BLOCK 3 | COMPRESS BLOCK 4 |
| | WRITE BLOCK 3 | WRITE BLOCK 4 |

$\Delta T1$ t=0    t=$T_1$    t=$T_2$    t=$T_3$

*Figure 5*

METHOD, SYSTEM AND PROGRAM STORAGE DEVICE FOR PROVIDING A BACKUP OF DATA OF A MEMORY TO AT LEAST ONE STORAGE MEDIUM

BACKGROUND

This invention relates to a method and system for providing a backup of data. More particularly, this invention relates to a method and system for providing a backup of data of a memory, in compressed form, to at least one storage medium using a pipelined compress-and-write operation.

A backup or dump in a computing system is the printing or the copying of contents of a volatile memory, such as a random access memory (RAM), to a more permanent storage medium, such as a hard disk. Such a dump is made for purposes such as debugging a program or for providing a backup of operational data during a system crash. For the latter purpose, the length of time taken to perform the dump determines the downtime of the computing system. It is therefore desirable to reduce the time it takes for such a dump so as to reduce the system downtime.

Some computing systems, such as high-end servers, require the backup of a large amount of data which may be in the range of about 256 Gbytes. With an average dump speed to a hard disk of about 4 Mbytes per second, it takes approximately 18 hours to complete a dump of the data. An 18-hour downtime for a computing system is considered by many to be too high and unacceptable by today's system availability standards. A dump of a selected portion of the data instead of all the data is also not an option in many systems.

Compressing the data in the memory and dumping the smaller-sized compressed data is one technique that is used for providing a backup of data for the memory. An example of where such a technique is used is disclosed in the U.S. Pat. No. 5,734,892, Chu, entitled "Efficient Method and Apparatus for Access and Storage of Compressed Data." According to the patent, portions of a data file are compressed until they reach a logical block size which matches a given block size on a storage medium, such as a sector or segment of a hard disk. The portion of compressed data is stored into a sector allocated to it, and a table is built correlating the range of original data to the sector storing the compressed data. In this way, data is initially compressed into a block size which matches the characteristics of the particular storage medium used. Thus the method efficiently stores compressed data by filling allocated sectors. However, such a method requires sequential compression of data and writing of compressed data to the storage medium. Writing of compressed data commences only after the compressing of data reaches the block size. And further compressing of data in the data file to produce another similar sized block of compressed data begins only after the earlier compressed data has been stored to an allocated sector as shown in FIG. 6 of the patent. Concurrency cannot be exploited using this technique.

SUMMARY

According to an aspect of the present invention, there is provided a method of providing a backup of data of a memory portion, by at least one compressor and writer pair, to at least one storage medium having a plurality of segments. The method includes partitioning the memory portion into a number of memory blocks. The compressor compresses data, block by block, to produce compressed data for each block. The writer writes the compressed data for each block to an associated segment of the storage medium. Compressing and writing are synchronized and occur in a pipelined manner with the compressor being able to compress data of a next block without having to wait for the completion of writing of compressed data of an earlier block to the storage medium.

According to another aspect of the present invention, there is a program storage device readable by a computing device, tangibly embodying a program of instructions, executable by the computing device to perform the above method for providing a backup of data of a memory portion, by at least one compressor and writer pair, to at least one storage medium including a plurality of segments.

According to yet another aspect of the present invention, there is a system for providing a backup of data. The system includes a memory portion that is partitioned into a plurality of memory blocks, at least one storage medium having a plurality of segments defined thereon, and mapping means for associating each of the plurality of memory blocks with one of the plurality of segments. The system also includes at least one compressor for block-by-block compression of data of the memory blocks and at least one writer associated with the compressor to define a compressor and writer pair. The writer operates in synchronization with the compressor for writing compressed data of each block to an associated segment in a pipelined manner.

BRIEF DESCRIPTION OF DRAWINGS

The invention will be better understood with reference to the drawings, in which:

FIGS. 4A and 4B are flowcharts illustrating sequences of steps of a compressor and a writer respectively for implementing the sequence in FIG. 3;

FIG. 5 is a drawing showing time taken by a backup operation using the sequences in FIGS. 3, 4A and 4B in contrast with a sequential backup operation.

DETAILED DESCRIPTION

Figure 1:
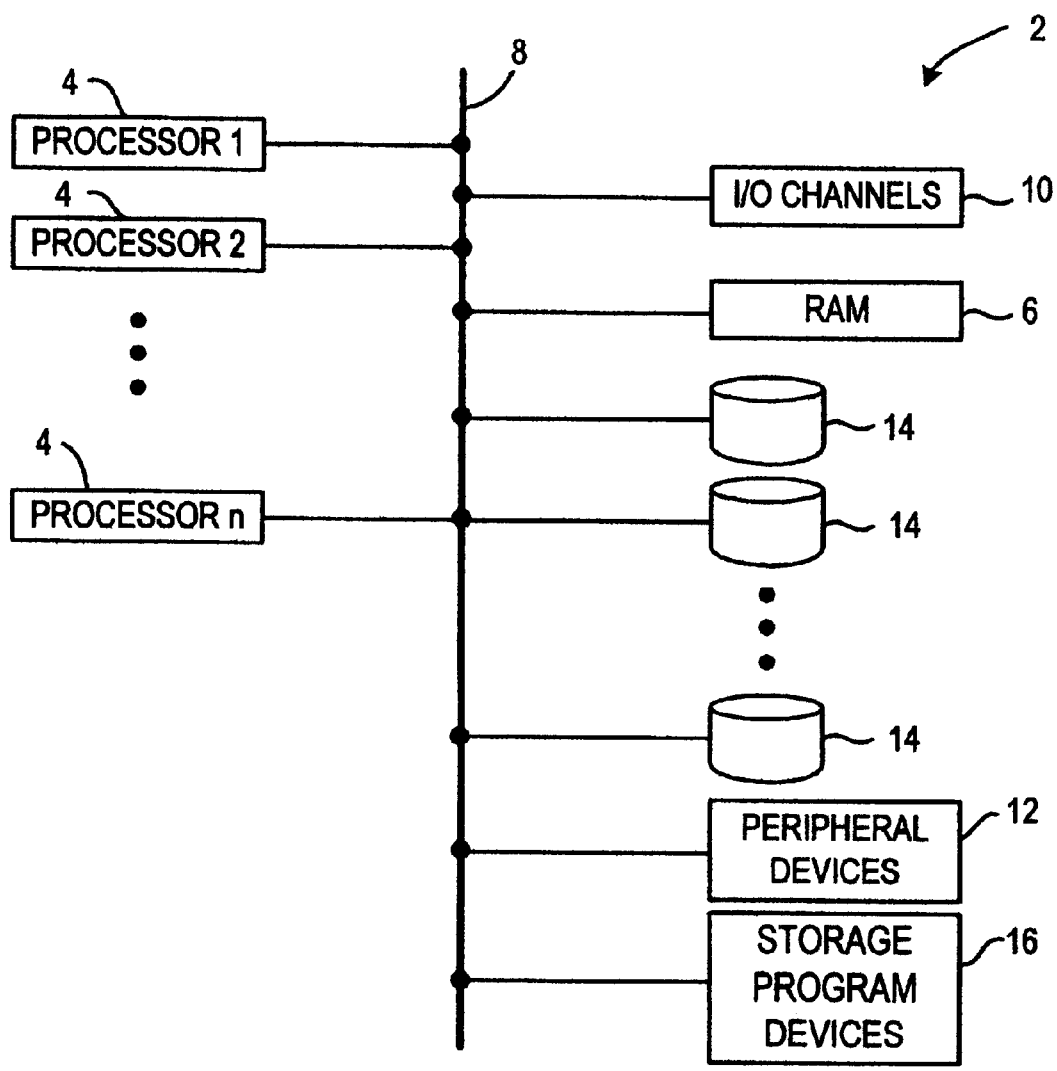
FIG. 1 is a block diagram showing typical elements of a computing system, including a RAM and a plurality of hard disks.

FIG. 1 is a block diagram illustrating typical elements of a computing system 2. The elements include a plurality of processors 4 connected to a system memory, such as a random access memory (RAM) 6, via a system bus 8. The processors 4 access the system memory 6 as well as other input/output (I/O) channels 10 and peripheral devices 12. These peripheral devices 12 include devices, such as hard disk drives for writing to and reading from a plurality of storage media, such as hard disks 14. The computing system 2 further includes at least one program storage device 16, such as a CD-ROM, tape, magnetic media, EPROM, EEPROM, ROM or the like that stores one or more computer programs for implementing a memory backup method according to the present invention. The processors 4 read and execute the one or more computer programs to perform the method. This method will be described in detail shortly. Each of the computer programs may be implemented in any desired computer programming language (including machine, assembly, high level procedural, or object oriented programming languages). In any case, the language may be a compiled or interpreted language.

Hereafter, one embodiment of the present invention will be described in the context of providing a backup of data in the RAM 6 to the hard disks 14. However, it is to be understood that the invention can be used for providing a backup of data of a portion of a memory to a secondary store.

Figure 2:
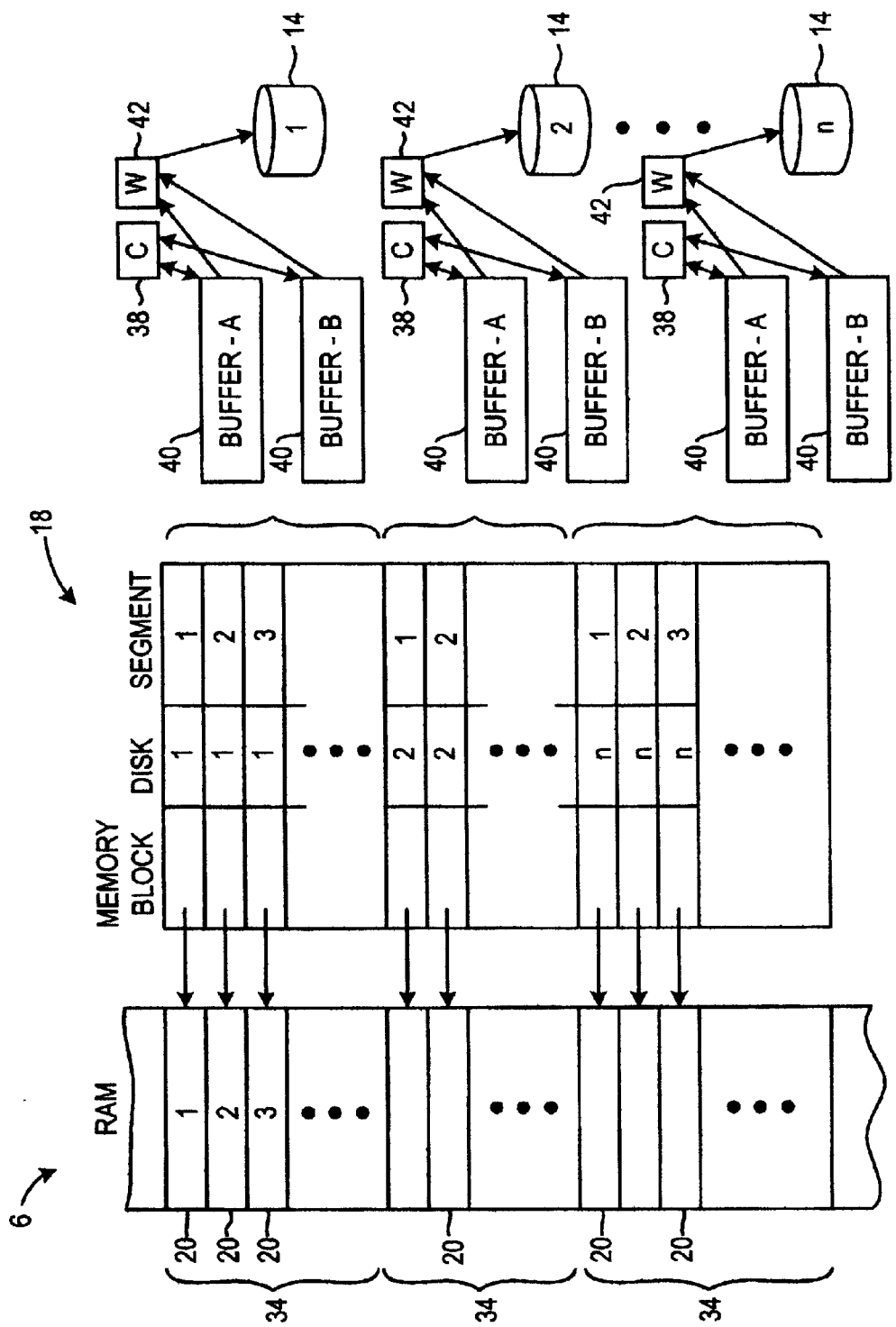
FIG. 2 is a schematic drawing showing a mapping table used for associating memory blocks of the RAM with segments of the plurality of hard disks in FIG. 1.
Figure 3:
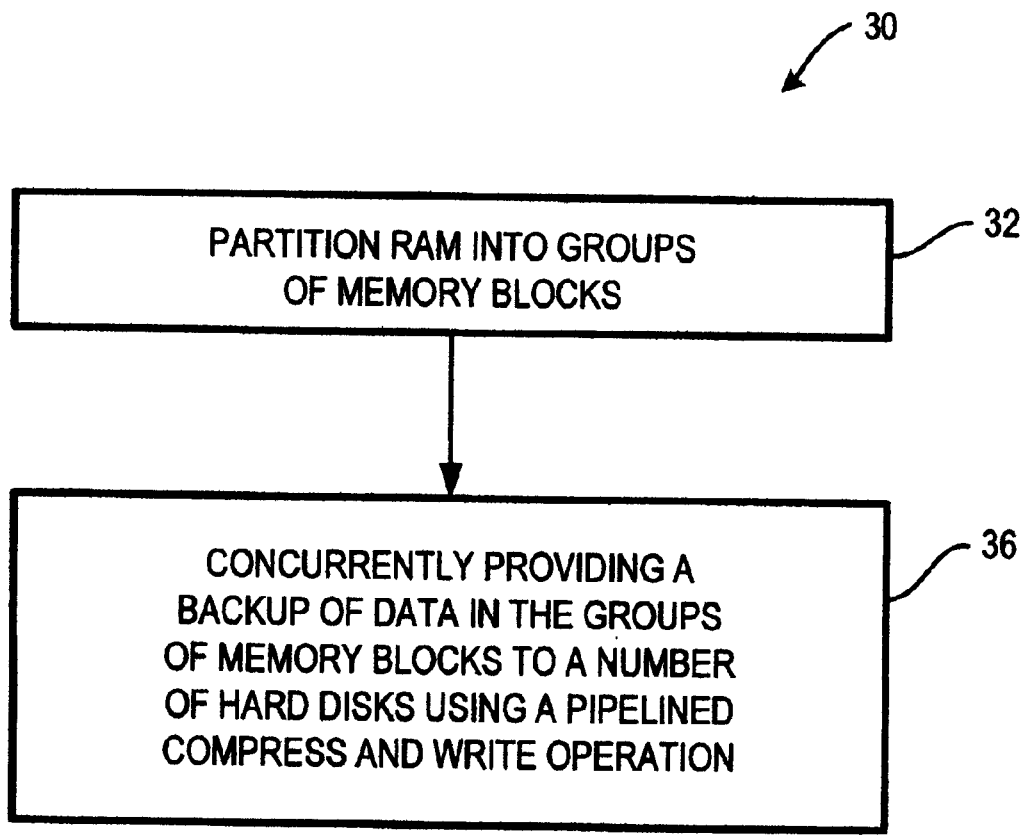
FIG. 3 is a flowchart illustrating a sequence of steps for providing a backup of data in the memory blocks to at least one hard disk of FIG. 2 according to an embodiment of the present invention.

FIG. 2 is a schematic drawing showing a mapping means, such as a mapping table 18, for correlating or associating memory blocks 20 of the RAM 6 with segments (not shown) of the hard disks 14. Each entry in the mapping table 18 indicates which segment on a particular hard disk 14 is used to store compressed data of a memory block 20. FIG. 3 is a flowchart illustrating a sequence 30 of steps for providing a backup of data in the memory blocks 20 to at least one hard disk 14 according to an embodiment of the present invention. The sequence 30 may for example be implemented as part of a shutdown procedure when a fatal error is encountered during operation of the computing system 2. Broadly, as illustrated in FIG. 3, the sequence 30 starts in a partition memory step 32, wherein the RAM 6 is partitioned into a plurality of memory blocks 20. The size of each memory block 20 is selected such that the size of compressed data for each memory block 20, in the worst case, would fit in a hard disk segment. The memory blocks 20 are preferably grouped to form groups 34 of memory blocks 20 as shown in FIG. 2. The memory blocks 20 are grouped according to the hard disk 14 that is used to store compressed data of the memory blocks 20.

The sequence 30 next proceeds to a pipelined compress/write step 36, wherein a compressor 38 is assigned to each group 34 of memory blocks 20. Each compressor 38 compresses data, block by block, for storage on associated segments of a designated hard disk 14 according to the mapping table 18. Each compressor 38 alternates between the use of one of at least two buffers 40 for storing compressed data. Each buffer 40 is used, by a compressor 38, to store compressed data of a memory block 20.

In the pipelined compress/write step 36, a writer 42 is also assigned to each group 34 of memory blocks 20. This writer 42 is associated with the compressor 38 for the group 34 to form a compressor and writer pair. Whenever compressed data of a memory block 20 is available in any one of the buffers 40, the writer 42 copies the compressed data to a hard disk segment associated with the memory block 20. Synchronization between the compressor 38 and the writer 42 is via a flag (not shown) associated with each buffer 40. The compressor 42 signals to the writer 38 that compressed data is ready for storing to the hard disk 14 by setting the flag to a logic one. Similarly the writer 42 upon copying the compressed data to the hard disk 14, signals to the compressor 38 that the buffer 40 can be reused by setting the flag to a logic zero. In this manner, the compressor 38 and writer 42 are tightly coupled to each other. With at least two buffers 40, while the writer 42 is copying compressed data of a memory block 20 in a buffer 40 to the hard disk 14, the compressor 38 can use the at least one other buffer 40 for concurrently storing compressed data of a next memory block 20 in a pipelined manner.

The detailed operation of the compressor 38 is next described with the aid of FIG. 4A which shows a sequence 44 of steps. This compressor sequence 44 begins with an initialization step 46. In this step 46, the flags of both the buffers 40 (BUFFER_A and BUFFER_B) are set to logic one's to indicate that both buffers 40 are available for storing of compressed data. BUFFER_A is also selected to be a current buffer for use by the compressor 38 and a current memory block pointer is initialized to point to the first memory block 20 of the group 34.

The compressor sequence 44 proceeds next to a first decision step 48, wherein the flag associated with the current buffer 40 is checked to determine if the current buffer is available for use by the compressor 38. If it is determined that the current buffer 40 is unavailable, the compressor sequence 44 either waits or loops around the decision step 44 until the current buffer 40 is available. If it is determined that the current buffer 40 is available, which should be the case when the compressor sequence 44 enters the decision step 48 for the first time, the compressor sequence 44 proceeds to compress data of the memory block 20 pointed to by the current memory block pointer in a compress data step 50. The compressor 38 stores the compressed data of the memory block 20 in the current buffer 40. When the data of the memory block 20 is completely compressed, the compressor sequence 44 proceeds to set the flag of the current buffer 40 to a logic zero in a synchronizing step 52. This setting of the flag to a logic zero indicates that the associated current buffer 40 has become unavailable for use by the compressor 38 until compressed data in the buffer 40 is copied to the hard disk 14.

The compressor sequence 44 next proceeds to determine if the memory block 20 pointed to by the pointer is the last memory block in the group 34 in a second decision step 54. If it is determined in this step 54 that the current memory block 20 is the last memory block 20 in the group 34, the compressor sequence 44 ends in a terminating step 56. If it is however determined that the current memory block 20 is not the last block in the group 34, the compressor sequence 44 next proceeds to select the other buffer 40 to be the current buffer 40 and to advance the pointer to point to a next memory block 20 in a change buffer step 58 and an advance pointer step 60 respectively. The compressor sequence 44 then loops back to the first decision step 48 to repeat the compressor operation on the currently pointed to memory block 20 using the current buffer 40.

FIG. 4B shows a sequence 70 of steps taken by the writer 42. Similar to the compressor sequence 44, the writer sequence 70 starts in an initialization step 71, wherein the writer 42 selects one of the buffers 40 (BUFFER_A) to be the current buffer 40. The writer sequence 70 next proceeds to a first decision step 72 to check if the flag associated with the current buffer 40 is a logic zero to determine if compressed data is available for storing to the hard disk segment. If it is determined that the flag is not a logic zero but a logic one, the writer sequence 70 will either wait or loop around this step 72 until the compressor 40 sets the flag to a logic zero. If it is determined that the flag of the current buffer 40 is a logic zero, the writer sequence 70 proceeds to a write compressed data step 74 to copy the compressed data in the current buffer 40 to an associated segment of the hard disk 14.

The writer 42 next determines if the memory block 20 is the last memory block in the group 34 in a second decision step 76. If it is determined that the memory block 20 is the last block, the writer sequence 70 ends in a terminating step 78. If it is however determined that the memory block 20 is not the last memory block in the group 34, the writer sequence 70 proceeds to free the buffer 40 by setting the flag of the current buffer 40 to logic one in a synchronizing step 80. The other buffer 40 is also set to be the current buffer in a change buffer step 82. The writer sequence 70 then loops back to the first decision step 72 to wait for compressed data to be made available in the current buffer 40 before proceeding as previously described.

In this manner, synchronization between the compressor 38 and the writer 42 is achieved. The compression of data and writing of compressed data is overlapped to allow two memory blocks 20 to be operated on concurrently in a pipelined manner as described. Without pipelining, the compressor 38 has to wait for the writer 42 to complete copying data before the compressor 38 starts compressing data of another memory block 20 as shown in FIG. 5. Such a sequential operation leaves the compressor 38 idle during copying of the compressed data to the hard disk 14. With pipelining, made possible by the at least two buffers 40, the compressor 38 can concurrently compress data of a next memory block 20 while the writer 38 copies compressed data of a previous memory block 20 to the hard disk 14. As a result, a larger number of memory blocks 20 can be processed in a given period as compared to the sequential approach. Even though there is some sequential dependency between the compressing of data of a memory block 20 and the writing of the compressed data of that block 20 to the hard disk 14, the overall backup operation takes less time to complete as shown in FIG. 5. A time saving of a period ΔT2 is possible with one compressor and writer pair.

The compressor and writer pairs for each group of memory blocks can be operated concurrently to further reduce the overall backup time of the memory. FIG. 5 shows a time saving of a period of ΔT1 when two compressor and write pairs are operated concurrently. The number of compressor and writer pairs is ideally less than. or equal to the number of hard disks 14. This approach may be implemented on a single-processor system where writing to the hard disks is performed using direct memory access (DMA). Alternatively, the approach may be implemented on a multi-processor system with at least two processors including a first processor for running the compressors 38 and a second processor for running the writers 42, especially if writing to the hard disks involves polled input/ouput.

Advantageously, the method described above reduces the overall time taken to provide a backup of data in a memory.

Although the present invention is described using the above embodiment, it is not to be construed to be limited as such. For example, the table 18 in the embodiment that contains information regarding where (which segment of a particular hard disk) compressed data of each memory block 20 is to be stored may be replaced by other mapping means. One such means includes determining a segment of a hard disk for storing compressed data of a particular memory block 20 using the position of the memory block 20 within the RAM 6.

As another example, the data in a memory block 20 may be read into another buffer prior to being compressed.

We claim:

1. A method of providing backup of data of a memory to at least one storage medium having a plurality of segments comprising:

partitioning the memory into a plurality of memory blocks of data;

compressing the data in a first block to produce a first compressed data associated with the first memory block;

writing the first associated compressed data to a first associated segment of the storage medium; and synchronizing the steps of compressing and writing to allow compressing a second block of data to produce a second associated compressed data while writing the first associated compressed data to effect pipelined compressing and writing of blocks of data.

2. A method according to claim 1, wherein the first associated compressed data is stored in one of at least two buffers and the second associated compressed data is stored in another buffer of the at least two buffers.

3. A method according to claim 2, wherein each of the at least two buffers includes an associated flag for synchronizing the use of a buffer between compressing and writing.

4. A method according to claim 1, wherein the at least one storage medium includes a plurality of storage media and the method further includes multiple compressing and writing steps operate concurrently with each pair of compressing and writing steps providing a backup of data of a predetermined group of memory blocks to at least one of the plurality of storage media.

5. A method according to claim 4, wherein the number of pairs of compressing and writing steps equals the number of storage media.

6. A program storage device readable by a computing device, tangibly embodying a program of instructions, executable by the computing device to perform a method for providing a backup of data of a memory portion to at least one storage medium having a plurality of segments, the method comprising:

partitioning the memory into a plurality of memory blocks of data;

compressing the data in a first block to produce a first compressed data associated with the first memory block;

writing the first associated compressed data to a first associated segment of the storage medium; and synchronizing the steps of compressing and writing to allow compressing a second block of data to produce a second associated compressed data while writing the first associated compressed data to effect pipelined compressing and writing of blocks of data.

7. A program storage device according to claim 6, wherein the first associated compressed data is stored in one of at least two buffers and the second associated compressed data is stored in another buffer of the at least two buffers.

8. A system for providing a backup of data comprising:

a memory partitioned into a plurality of memory blocks of data;

at least one storage medium having a plurality of segments;

mapping means for associating each of the plurality of memory blocks with one of the plurality of segments;

at least one compressor compressing the data in a first block to produce a first compressed data associated with the first memory block;

at least one writer associated with the compressor to define a compressor and writer pair for writing the first associated compressed data to a first associated segment of the storage medium;

wherein the compressor and the writer are synchronized to allow the compressor to compress a second block of data to produce a second associated compressed data while the writer writes the first associated compressed data to effect pipelined compressing and writing of blocks of data.

9. A system according to claim 8, further including at least two buffers associated with each pair of compressor and writer, each buffer for storing compressed data of a memory block, wherein while the writer writes compressed data in one buffer to the storage medium, the compressor is able to use another buffer of the at least two buffers to concurrently compress data of at least one next block.

10. A system according to claim 9, further including a flag associated with each buffer for synchronizing use of the buffer by the compressor and the writer.

11. A system according to claim 9, wherein the at least one storage medium includes a plurality of storage media and the at least one compressor and writer pair includes a plurality of compressor and writer pairs operating concurrently with each compressor and writer pair providing backup of data of a predetermined group of memory blocks to at least one of the plurality of storage media.

12. A system according to claim 11, wherein the number of compressor and writer pairs equals the number of storage media.

13. A method of providing a backup of data of a memory portion with at least one compressor and writer pair to at least one storage medium having a plurality of segments, the method comprising:

partitioning the memory portion into a number of memory blocks;

the compressor compressing data, block by block, to produce compressed data for each block; and the writer writing the compressed data for each block to an associated segment of the storage medium;

wherein the compressing and writing are synchronized and occur in a pipelined manner with the compressor being able to compress data of a next block without having to wait for the completion of writing of compressed data of an earlier block to the storage medium.

14. A method according to claim 13, wherein compressed data of each block is stored in one of at least two buffers and while the writer writes compressed data in one buffer to the storage medium, the compressor is able to use the at least one other buffer to concurrently compress data of at least one next block.

15. A method according to claim 14, wherein the compressing and writing are synchronized with the compressor indicating to the writer that compressed data is available in one of the buffers for writing to the storage medium, and the writer indicating to the compressor that compressed data in a buffer has been written to the storage medium and the buffer is again available for use by the compressor.

16. A method according to claim 15, wherein each of the buffers include an associated flag that is manipulated by the compressor and the writer for synchronizing the use of a buffer between the compressor and the writer.

17. A method according to claim 13, wherein the at least one storage medium includes a plurality of storage media and the at least one compressor writer pair includes a plurality of compressor and writer pairs operating concurrently with each compressor and writer pair providing a backup of data of a predetermined group of memory blocks to at least one of the plurality of storage media.

18. A method according to claim 17, wherein the number of compressor and writer pairs equals the number of storage media.

* * * * *